US012012343B2

(12) United States Patent
Dejarme et al.

(10) Patent No.: US 12,012,343 B2
(45) Date of Patent: Jun. 18, 2024

(54) DESTRUCTION OF PFAS IN THE PRESENCE OF SILICA

(71) Applicant: Battelle Memorial Institute, Columbus, OH (US)

(72) Inventors: Lindy E. Dejarme, Columbus, OH (US); Kavitha Dasu, Powell, OH (US)

(73) Assignee: Battelle Memorial Institute, Columbus, OH (US)

( * ) Notice: Subject to any disclaimer, the term of this patent is extended or adjusted under 35 U.S.C. 154(b) by 263 days.

(21) Appl. No.: 17/080,781

(22) Filed: Oct. 26, 2020

(65) Prior Publication Data

US 2021/0139354 A1 May 13, 2021

Related U.S. Application Data

(60) Provisional application No. 62/926,473, filed on Oct. 26, 2019.

(51) Int. Cl.
| | | |
|---|---|---|
| C02F 1/52 | (2023.01) | |
| C01B 33/12 | (2006.01) | |
| C02F 1/02 | (2023.01) | |
| C02F 1/72 | (2023.01) | |
| C03C 3/089 | (2006.01) | |
| C02F 101/36 | (2006.01) | |

(52) U.S. Cl.
CPC ............ C02F 1/5236 (2013.01); C01B 33/12 (2013.01); C02F 1/02 (2013.01); C02F 1/722 (2013.01); C03C 3/089 (2013.01); *C02F 2101/36* (2013.01); *C02F 2101/40* (2013.01)

(58) Field of Classification Search
CPC .................................................... C02F 1/5236
See application file for complete search history.

(56) References Cited

U.S. PATENT DOCUMENTS

| 5,492,634 | A | 2/1996 | Hong et al. | |
|---|---|---|---|---|
| 9,694,401 | B2 | 7/2017 | Kerfoot | |
| 2008/0286556 | A1* | 11/2008 | D'urso | C03C 11/005 |
| | | | | 428/315.5 |
| 2014/0246366 | A1* | 9/2014 | Kerfoot | C02F 1/722 |
| | | | | 210/170.07 |
| 2017/0174583 | A1* | 6/2017 | Felch | C07C 1/323 |

(Continued)

OTHER PUBLICATIONS

Dickenson et al., "Treatment Mitigation Strategies for Poly- and Perfluoroalkyl Substances", Water Research Foundation, 2016, Web Report #4322.

(Continued)

*Primary Examiner* — Peter Keyworth
(74) *Attorney, Agent, or Firm* — Susanne A. Wilson; Frank Rosenberg

(57) ABSTRACT

We have discovered that heating PFAS in the presence of silica resulted in destruction of over 90% of PFAS under surprisingly mild conditions. Experimental results are presented showing that the reaction occurs along with etching of the silica glass, presumably caused by HF created during the reaction or in previous reactions. The methods of destroying PFAS are especially effective for treating relatively concentrated solutions such as those commonly encountered in AFFF waste stock and cleanup near firefighting training sites, as well as concentrated waste solutions from industrial sites involving the manufacture or application of PFAS.

15 Claims, 2 Drawing Sheets

(56) References Cited

U.S. PATENT DOCUMENTS

2017/0217803 A1* 8/2017 Theodore ............... C02F 3/302
2020/0155885 A1* 5/2020 Strathmann ............. A62D 3/36

OTHER PUBLICATIONS

Da Silva-Rackov et al, "Degradation of PFOA by Hydrogen Peroxide and Persulfate Activated by Iron-Modified Diatomite," Applied Catalysis B: Environmental 192:253-259 (2016).

Merino et al, "Degradation and Removal Methods for Perfluoroalkyl and Polyfluoroalkyl Substances in Water," Environmental Engineering Science 33:9 (2016).

International Search Report and Written Opinion from International Application No. PCT/US2020/057427 dated Feb. 5, 2021.

Bentel et al, "Defluorination of Per- and Polyfluoroalkyl Substances (PFASs) with Hydrated Electrons: Structural Dependence and Implications to PFAS Remediation and Management", Environmental Science & Technology, 2019, 53 (7), 3718-3728, ACS Publications.

Wang et al, "Influence of calcium hydroxide on the fate of perfluorooctanesulfonate under thermal conditions", Journal of Hazardous Materials, 192 (2011) 1067-1071, Elsevier B.V.

Nzeribe et al, "Physico-Chemical Processes for the Treatment of Per- And Polyfluoroalkyl Substances (PFAS): A review", Critical Reviews in Environmental Science and Technology, 2019, 49:10, 866-915, Taylor & Francis Group.

Ross et al, "A review of emerging technologies for remediation of PFASs", Remediation, 2018; 28:101-126, Wiley Periodicals, Inc.

Wu et al, "Rapid Destruction and Defluorination of Perfluorooctanesulfonate by Alkaline Hydrothermal Reaction", Environmental Science & Technology Letters, 2019, vol. 6, No. 10, 630-636, ACS Publications.

Dicalite Minerals Corp., Msds Diatomaceous Earth, trade name: Dicalite, Nov. 2011.

Pignatello et al., "Advanced Oxidation Processes for Organic Contaminant Destruction Based on the Fenton Reaction and Related Chemistry," Crit. Rev. Environ. Sci. Tech., 36:1-84, 2006.

Office Action in European Application No. EP20811167.4A dated Jul. 6, 2023.

Office Action in European Application No. EP20811167.4A dated Apr. 19, 2024.

* cited by examiner

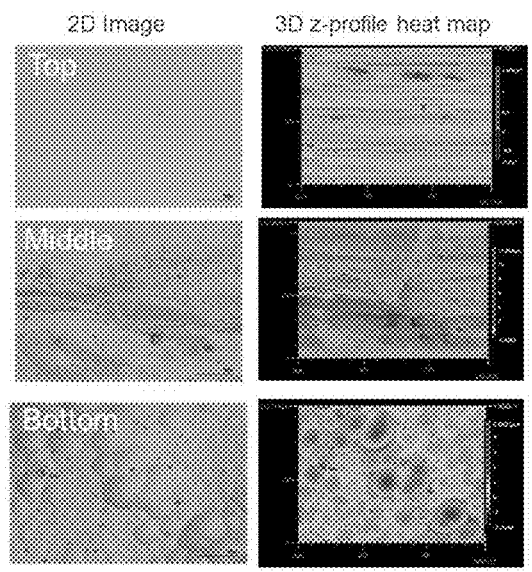

- Top of the glass liner - Surface is very smooth, shows no signs of cracking or etching

- Middle piece of glass liner - Cracking/pitting and staining observed throughout the surface

- Bottom part of glass liner - Uniformly dispersed Circular etched/pitted surface circular pits that show some resemblance to the circular pits observed on Concentrated Stock and NaOH

Fig. 2

DESTRUCTION OF PFAS IN THE PRESENCE OF SILICA

RELATED APPLICATIONS

This application claims the priority benefit of U.S. Provisional Patent Application Ser. No. 62/926,473 filed 26 Oct. 2019.

INTRODUCTION

Per- and polyfluoroalkyl substances (PFAS), including perfluorooctane sulfonate (PFOS) and perfluorooctanoic acid (PFOA). and hundreds of other similar compounds, have been widely used in the United States in a multitude of applications, and there are significant associated concerns due to widespread contamination coupled with uncertainties about risks to human health and the environment. PFAS are molecules having chains of carbon atoms surrounded by fluorine atoms. In some embodiments, a limited set of PFAS comprises fluorocarbons having from five to twenty carbon atoms in the molecules. The C-F bond is very stable and the compounds persist in the natural environment. Some PFAS include hydrogen, oxygen, sulfur, phosphorus, and/or nitrogen atoms. One example is PFOS:

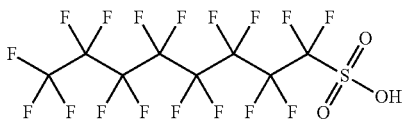

Although some PFAS compounds with known human health risks have been voluntarily phased out (PFOA and PFOS), legacy contamination remains. Additional replacement PFAS compounds have been introduced with limited understanding of their health risks. Currently, only PFOA and PFOS are addressed in Lifetime Health Advisories at the Federal level, with no established maximum contaminant level (MCL) to regulate the acceptable level of these and other PFAS compounds in drinking water. PFAS contamination in drinking water sources has been estimated as affecting 110 million people in 40 states. Currently used techniques for treating PFAS-contaminated water are expensive, and management of spent media is costly and may result in long-term liability.

SUMMARY OF THE INVENTION

In a first aspect, the invention provides a method of destroying PFAS, comprising: reacting PFAS in an aqueous solution in the presence of silica at a temperature of at least 100° C.; wherein at least 90% of the PFAS is destroyed.

The invention can be further characterized by one or any combination of the following: further comprising etching the silica with aqueous HF prior to the step of reacting PFAS in an aqueous solution in the presence of silica at a temperature of at least 100° C.; wherein at least 90% of the PFAS is destroyed; wherein the HF does not originate from PFAS; wherein the HF is formed from a PFAS solution comprising at least 50 PPM PFAS; wherein the silica comprises a borosilicate glass in which the reaction is conducted; wherein the method is conducted at a temperature at 110 to 250, or 110 to 200, or 110 to 180, or 110 to 160; or 120 to 250, or 120 to 200, or 120 to 180, or 120 to 160; or 130 to 250, or 130 to 200, or 130 to 180, or 130 to 160; or 140 to 250, or 140 to 200, or 140 to 180, or 140 to 160; or 150 to 250, or 150 to 200, or 150 to 180, or 150 to 160, all ° C.; conducted at a pressure (gauge) of at least 2 atm, or at least 4 atm, or 2-10 atm; conducted at a N2 or Ar partial pressure of at least 2 atm, or at least 4 atm, or 2-10 atm; conducted in a continuous reactor or conducted in a batch process for between 10 minutes and 5 hours; conducted in the absence or essentially in the absence of: additional reactants, UV, and additional catalysts; wherein the compositions present in the reaction consist essentially of water, PFAS, hydrogen peroxide, calcium hydroxide, silica and intermediates or products occurring in the method; wherein the silica comprises silica particles and, optionally, wherein the reaction is not conducted in a glass vessel; wherein at least 95%, or 99%, or 99.99 of the PFAS or PFOA and/or PFOS is destroyed; wherein the method begins with an aqueous solution comprising at least 50 parts per million (ppm), or at least 100 ppm, at least 1000 ppm PFAS, and optionally up to 10,000 ppm PFAS (as is conventional, ppm is on a mass basis); wherein the method begins with an aqueous solution comprising at least 50 ppm, or at least 100 ppm, at least 1000 ppm PFOA, and optionally up to 10,000 ppm PFOA; wherein the method begins with an aqueous solution comprising at least 50 ppm, or at least 100 ppm, at least 1000 ppm PFOS, and optionally up to 10,000 ppm PFOS.

In a related aspect, the invention comprises a system comprising PFAS in an aqueous solution in the presence of etched silica at a temperature of at least 100° C. Etched silica can be identified by microscopic inspection as shown in the Figures. This system can be additionally characterized by any of the features of the method including compositions, times, temperatures, and other conditions.

In another aspect, the invention provides a method of destroying PFAS, comprising: reacting PFAS in an aqueous solution in the presence of silica or boron at a temperature of at least 100° C.; wherein at least 90% of the PFAS is destroyed. In a further aspect, the invention provides a method of destroying PFAS, comprising: reacting PFAS in an aqueous solution in the presence of borosilicate glass at a temperature of at least 100° C.; wherein at least 90% of the PFAS is destroyed.

The invention can be further characterized by one or any combination of the following features: conducted at a temperature at 110 to 250, or 110 to 200, or 110 to 180, or 110 to 160;

or 120 to 250, or 120 to 200, or 120 to 180, or 120 to 160; or 130 to 250, or 130 to 200, or 130 to 180, or 130 to 160; or 140 to 250, or 140 to 200, or 140 to 180, or 140 to 160; or 150 to 250, or 150 to 200, or 150 to 180, or 150 to 160, all ° C.; conducted at a pressure of at least 2 atm, or at least 4 atm, or 2-10 atm; conducted continuously or in batches; conducted so that the materials are in contact for at least 10 seconds or at least 30 seconds or at least 1 minute or at least 10 minutes or at least 30 minutes; conducted for less than 1 hour, more preferably less than 35 minutes; conducted in the absence of additional reactants, for example, no peroxides, no UV, no added calcium, no additional oxidation or reduction reactants, and/or no additional catalysts; wherein silica or borosilicate are present as part of the reaction vessel or as added materials such as added powders or pellets; wherein at least 95%, or 99%, or 99.99 of the PFAS or PFOA and/or PFOS is destroyed; wherein the level of PFAS (or the level of PFOS+PFOA) is reduced to 70 ng/L or less.

The method of any of the above wherein the aqueous PFAS solution comprises at least 1 ppm PFAS (by mass).

Alternatively, the method can be described as consisting essentially of water, PFAS, and at least one of boron, silica, and/or borosilicate.

The invention also includes systems comprising any of the above components (including combinations thereof) at any of the above conditions.

Any of the methods can, in some embodiments, be employed in a treatment of purifying water for human consumption.

Various aspects of the invention are described using the term "comprising;" however, in narrower embodiments, the invention may alternatively be described using the terms "consisting essentially of" or, more narrowly, "consisting of."

Glossary

PFAS-containing fire-fighting foams are foaming compositions that have been used to coat fires and prevent contact with oxygen. Commonly, fire-fighting foams are water-based materials and are identified by the acronym AFFF (Aqueous film forming foams). Because AFFF has the industry standard for fighting fires at airfields, AFFF contamination is commonly found in and around airfields and fire fighting training sites. AFFF waste materials from these locations can be effectively treated using methods of the present invention.

The destruction of PFOA and PFOS is measured by the percentage of each of these compounds remaining after treatment (i.e., (% destruction=100%×((initial mass PFOA—remaining mass PFOA)/(initial mass PFOA)). Likewise the destruction of PFAS is measured in the same fashion.

Pressure references in the application refer to gauge pressure.

BRIEF DESCRIPTION OF THE DRAWINGS

FIG. 2. 3D Laser Scanning Confocal Microscope Surface analysis pictures of three portions of glass liner treated under different reaction conditions.

DETAILED DESCRIPTION OF THE INVENTION

Figure 1:
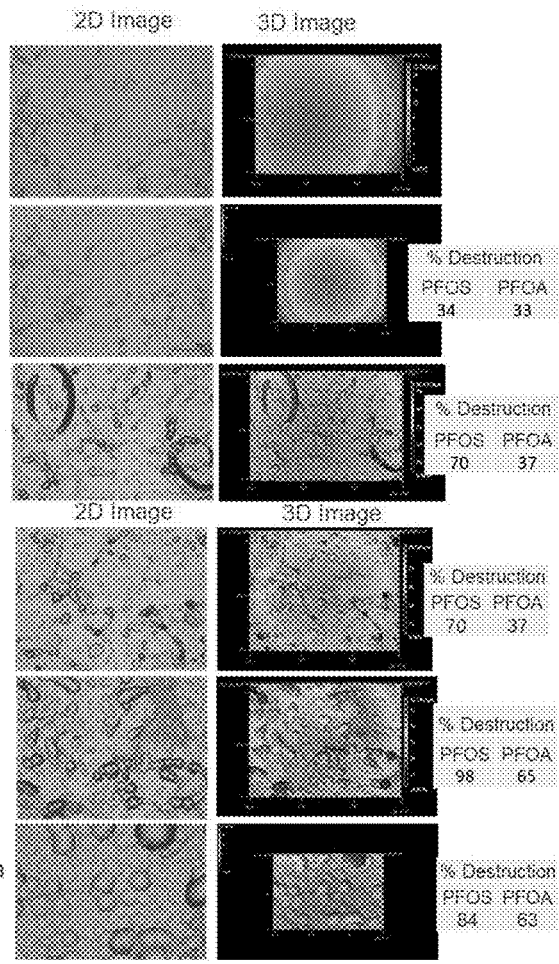
FIG. 1. 3D Laser Scanning Confocal Microscope Surface analysis pictures of glass beads treated under different reaction conditions.

The PFAS component of the invention can be derived from any source, preferably the solution subjected to the treatment comprises at least 50 ppm PFAS. Ideal sources are, concentrated aqueous PFAS waste or concentrated aqueous PFAS recovered from sites where AFFF was used. If needed, the aqueous PFAS can be filtered or centrifuged to remove solids. Compared to many systems, the PFAS can be relatively concentrated, preferably at least 50 ppm PFAS or at least 100 ppm or at least 500 ppm PFAS; some solutions may comprise at least 50 ppm PFOA or at least 100 ppm or at least 500 ppm PFOA or at least 50 ppm PFOA or at least 100 ppm or at least 500 ppm PFOA or comprising at least 50 ppm or at least 100 ppm or at least 500 ppm of PFOA plus PFOS. An advantage of the invention is that it can proceed with high levels of PFAS, in some embodiments the upper level can be 1000 ppm or 1% (10,000 ppm) or higher.

The aqueous PFAS can be combined with hydrogen peroxide. Although hydrogen peroxide is not critical, it can be used at starting levels of at least 0.1% or 1% or at least 5% or at least 10% and upper bounds of 50% or 40% or 30% or 10%, or 5%. Calcium hydroxide ($Ca(OH)_2$) is not necessary but can be added; it is believed that the calcium hydroxide neutralizes the HF produced in the destruction and $CaF_2$ can form which is generally insoluble. Another advantage of the invention is that it does not result in undesired side products, for example, there are no heavy metals and relatively little or no waste. So, the PFAS can be eliminated and the product stream has little or no PFAS or other toxic materials that require further treatment. The product solution of the method preferably has 10 ppm PFAS or less, or 1 ppm PFAS or less, or 0.1 ppm PFAS or less.

A necessary component is the presence of silica. We have discovered that fresh glassware that is conventionally used in developing chemical reactions such as PFAS destruction is not suitable and does not inherently produce the levels of PFAS destruction that characterize the invention. The silica needs to be etched, preferably by treatment with HF. For some silica, the etching can be achieved in situ by running the reaction with relatively high levels of PFAS, at least 25 ppm PFAS, preferably at least 50 ppm PFAS or at least 25 ppm of PFOA and/or 25 ppm of PFOS. Alternatively, silica can be etched, preferably with HF, preferably aqueous HF, prior to use; since these etching conditions can be easily modified it is believed that any silica is suitable or can be identified with no more than routine experimentation. The invention can also be identified and characterized by at least 10% or at least 50% higher levels of PFAS destruction than would be observed under otherwise identical conditions but with conventional glassware in place of etched silica.

The etched silica can be merely vessel walls; more preferably etched silica structures are present within the vessel. For example, loose silica particles or pellets, a fixed bed of etched silica, a circulating bed of silica, a structure such as a honeycomb or other 3D structure through which a solution or slurry can pass. The silica is preferably at least 90% (mass %), or at least 95%, or at least 98% silicon plus oxygen in a 1:2 ratio. Silica has the conventional meaning of an amorphous material lacking long range order (i.e., not quartz).

The conditions of the reaction are far less severe than those encountered in supercritical water oxidation (SCWO) yet similar levels of destruction can be achieved. Temperatures are described above, a preferred range is 130 to 180° C. or 140 to 170° C. or 150 to 170° C. Pressure from an inert gas or oxygen-containing gas may be adjusted to maintain a liquid phase in contact with the silica. The reaction can be conducted batchwise, for example in a pressure bomb, or in continuous fashion.

The residence time can be adjusted based on the desired destruction of PFAS. Residence can be, for example, 1 minute to 300 minutes, or 10 minutes to 200 minutes, or 100 to 200 minutes. Other possible residence times include those mentioned herein. The invention can be further described in conjunction with any one or any combination of the features described above. The invention can be practiced following the descriptions herein. In some cases, following the guidance provided herein, some degree of experimentation may be used to identify apparatus, silica sources and treatment conditions to obtain desired levels of PFAS destruction. In any case, these features can be determined through no more than routine experimentation.

In addition to any selected combination of the features mentioned above, the invention can also be characterized as possessing characteristics as shown in the example or within ±10% or ±20% of any of the values shown in the Examples.

EXAMPLES

Destruction by Synergistic Application of High temperature, High Pressure, and Hydrogen Peroxide PFAS in water is mixed with Hydrogen Peroxide and Calcium Oxide. The solution is mixed, and placed inside a pressure vessel maintained at high temperature (for example, at least 250° F. or at least 300° F. (150° C.), in some embodiments in the range of 250 or 300° F. to 500° F.) and a pressure of at least 2 atm, preferably at least 3 atm, for example, pressurized to 5 atmospheres with nitrogen for 3 hours. The resultant precipitate formed in the reaction vessel can be separated from the supernatant liquid. PFAS are extremely unreactive. We discovered, surprisingly, that greater than 99% destruction could be achieved at relatively mild conditions by the reaction of PFAS with a combination of aqueous hydrogen peroxide and alkali or alkaline earth elements (or high temperature and increased pressure as above). The calcium oxide is added to the reaction mixture to quench the HF formation, which results in the formation of Calcium fluoride. Thus, the invention includes the reaction of PFAS with an aqueous solution of hydrogen peroxide and calcium oxide at a temperature of at least 100° C., preferably in the range of 120 to 200° C., or in the range of 130 to 170° C. or 140 to 160° C. Preferably, at least 90% or at least 95% or at least 99% of the PFAS is destroyed by the method.

Hydrogen Peroxide in the Presence of CaO

An aqueous solution of PFOS/PFOA was treated with hydrogen peroxide and CaO at 300 ° F. and pressure of 5 atm. 99.9% of PFOA and 99.5% of PFOS was destroyed and a precipitate formed. The glass reaction vessel was etched and an FTIR of a pale yellowish white precipitate showed the presence of sodium tetrafluoroborate along with other impurity, suspected to be calcium salt of fluoroborate is present as well; this occurred because the reaction was conducted in a glass casing inside the reactor and these glass walls were etched by HF produced in the reaction.

As shown in the data table below, even with no hydrogen peroxide and no calcium compounds, and only in the presence of the borosilicate glass, at 300° F. and pressure of 5 atm. under an inert gas (N2) 99.9% of PFOA and 99.9% of PFOS were destroyed and a precipitate formed. ND is not determined.

PFAS % Destruction

| Reactions | Generated by | % Destruction PFOA | PFOS |
|---|---|---|---|
| UV (CaO added at the end of the reaction and stirrer for 30 min) | PFOA/PFOS/H2O2/CaO | 22 | 32 |
| High Temp/High Pressure (with glass liner) | PFOA/PFOS/H2O2/CaO | 99.9999 | 99.9841 |
| High Temp/High Pressure (with glass liner) | PFOA/PFOS | 99.9999 | 99.9841 |
| High Temp/High Pressure (with glass liner) | PFOA/PFOS/CaO | 99.9967 | 99.9842 |
| High Temp/High Pressure (with glass liner) | Milli-Q Water | ND* | ND* |
| High Temp/High Pressure (No glass liner) | PFOA/PFOS/H2O2/CaO | 32 | 3 |

Evaluation of the Role of Glass Beads.

Experiments were conducted to explore different parameters for the destruction of PFOA and PFOS in water using Glass Beads and 30% Hydrogen Peroxide/CaO/High Pressure/High Temperature. In these reactions, to understand the role of glass liner for the PFAS destruction in our earlier experiments, only glass beads were used in the metal reactor without using the glass liner.

Fresh Glass Beads and 25 parts per million (ppm) PFOA and PFOS solution mix. A minimum of two replicates of a mix of 25 parts per million concentration of PFOA and PFOS solutions were taken in a 50-mL centrifuge tubes. To these solutions, 2mL of 30% hydrogen peroxide and 1mL of well mixed super saturated slaked lime solution, were added and the centrifuge tubes was mixed vigorously for at least 30 seconds. This reaction mixture is transferred to the Parr Pressure vessel (no glass liner) and 2.1 g of glass beads (57 glass beads) (Aldrich Part# Z14392-8 solvent rinsed and muffled at 450° C.) were added and the vessel was closed and the reaction mixture was pressurized to 5 atmospheres with nitrogen and heated the vessel to 300° F. for 180min. After 180 minutes, the heating was turned off and the reactor was allowed to cool down and the pressure was released. The contents of the reactor were transferred to a new centrifuge tube. A sample of the reaction mixture was submitted for PFAS analysis. Finally, the reactor was rinsed twice using 5 ml of 0.4% NH3 in methanol (needs to be prepared freshly) and transferred to another centrifuge tube and submitted for PFAS analysis.

When the fresh glass beads were used in the 25 ppm stock solution, there was ~15-20% destruction of PFOA and PFOS.

Fresh Glass Beads and Concentrated PFOA and PFOS Solution Mix.

A minimum of two replicates of a mix of concentrated solution of PFOA (~1000 ppm) and PFOS (~100 ppm) solutions were taken in a 50-mL centrifuge tubes. To these solutions, 2 mL of 30% hydrogen peroxide and 1 mL of well mixed super saturated slaked lime solution, were added and the centrifuge tubes was mixed vigorously for at least 30 seconds. This reaction mixture is transferred to the Parr Pressure vessel (no glass liner) and 2.1 g of glass beads (57 glass beads) (Aldrich Part# Z14392-8 solvent rinsed and muffled at 450° C.) were added and the vessel was closed and the reaction mixture was pressurized to 5 atmospheres with nitrogen and heated the vessel to 300° F. for 180 min. After 180 minutes, the heating was turned off and the reactor was allowed to cool down and the pressure was released. The contents of the reactor were transferred to a new centrifuge tube. A sample of the reaction mixture was submitted for PFAS analysis. Finally, the reactor was rinsed twice using 5 ml of 0.4% NH3 in methanol (needs to be prepared freshly) and transferred to another centrifuge tube and submitted for PFAS analysis.

Further experiments were performed under similar conditions using 10 g of glass beads. There was 58% of PFOA and 78% of PFOS destruction occurred (Table 1) and there was etching on the glass beads observed (FIG. 1).

Pre-used Glass Beads for 25ppm stock solution mix: A minimum of two replicates of a mix of 25 parts per million concentration of PFOA and PFOS solutions were taken in a 50-mL centrifuge tubes. To these solutions, 2 mL of 30% hydrogen peroxide and 1 mL of well mixed super saturated slaked lime solution, were added and the centrifuge tubes was mixed vigorously for at least 30 seconds. This reaction mixture is transferred to the Parr Pressure vessel (no glass liner) and 10 g of pre-used glass beads were added. These glass beads were used in PFOA and PFOS high concentration experiments, followed by cleaning thrice with methanol and MilliQ water prior to use. The vessel was closed and the reaction mixture was pressurized to 5 atmospheres with nitrogen and heated the vessel to 300° F. for 180min. After 180 minutes, the heating was turned off and the reactor was allowed to cool down and the pressure was released. The contents of the reactor were transferred to a new centrifuge tube. A sample of the reaction mixture was submitted for PFAS analysis. Finally, the reactor was rinsed twice using 5 ml of 0.4% NH3 in methanol and transferred to another centrifuge tube and submitted for PFAS analysis.

When the fresh glass beads were used in the 25 ppm stock solution, there was ~15-20% destruction of PFOA and PFOS, whereas when the pre-used glass beads (in concentrated Stock solution) were used, there was improved destruction of 65-98% destruction of PFOA and PFOS (Table 1), which indicates that the etching occurred during the pre-use with concentrated solution aided in the improved destruction (FIG. 1).

Fresh Glass Beads soaked in 10 M NaOH and concentrated stock solution: A minimum of two replicates of a mix of 25 parts per million concentration of PFOA and PFOS solutions were taken in a 50-mL centrifuge tubes. To these solutions, 2mL of 30% hydrogen peroxide and 1 mL of well mixed super saturated slaked lime solution, were added and the centrifuge tubes was mixed vigorously for at least 30 seconds. This reaction mixture is transferred to the Parr Pressure vessel (no glass liner) and 10 g of glass beads (Aldrich Part# Z14392-8 solvent rinsed and muffled at 450° C.) soaked overnight in 10 M NaOH and washed with MilliQ water prior to use were added and the vessel was closed and the reaction mixture was pressurized to 5 atmospheres with nitrogen and heated the vessel to 300° F. for 180 min. After 180 minutes, the heating was turned off and the reactor was allowed to cool down and the pressure was released. The contents of the reactor were transferred to a new centrifuge tube. A sample of the reaction mixture was submitted for PFAS analysis. Finally, the reactor was rinsed twice using 5 ml of 0.4% NH3 in methanol (needs to be prepared freshly) and transferred to another centrifuge tube and submitted for PFAS analysis. Under these conditions, there was 37% destruction of PFOA and 70% destruction of PFOS. When the glass beads were soaked in 10 M NaOH for extended time (2 overnights soaking with stirring in between during the daytime), there was 31% of PFOA destruction, however the PFOS destruction decreased to 9%.

Evaluation of the Role of Silica, Diatomaceous Earth and Sodium Tetraborate.

Silica and Concentrated Solution: A minimum of two replicates of a mix of concentrated solution of PFOA (1000 ppm) and PFOS (~100 ppm) solutions were taken in a 50-mL centrifuge tubes. To these solutions, 2mL of 30% hydrogen peroxide and 1mL of well mixed super saturated slaked lime solution, were added and the centrifuge tubes was mixed vigorously for at least 30 seconds. This reaction mixture is transferred to the Parr Pressure vessel (no glass liner) and 2.0 g of silica was added and the vessel was closed and the reaction mixture was pressurized to 5 atmospheres with nitrogen and heated the vessel to 300° F. for 180 min. After 180 minutes, the heating was turned off and the reactor was allowed to cool down and the pressure was released. The contents of the reactor were transferred to a new centrifuge tube. A sample of the reaction mixture was submitted for PFAS analysis. Finally, the reactor was rinsed twice using 5 ml of 0.4% NH3 in methanol (needs to be prepared freshly) and transferred to another centrifuge tube and submitted for PFAS analysis.

Diatomaceous Earth and Concentrated Solution: A minimum of two replicates of a mix of concentrated solution of PFOA (~1000 ppm) and PFOS (~100 ppm) solutions were taken in a 50-mL centrifuge tubes. To these solutions, 2mL of 30% hydrogen peroxide and 1 mL of well mixed super saturated slaked lime solution, were added and the centrifuge tubes was mixed vigorously for at least 30 seconds. This reaction mixture is transferred to the Parr Pressure vessel (no glass liner) and 10 g of Diatomaceous earth was added and the vessel was closed and the reaction mixture was pressurized to 5 atmospheres with nitrogen and heated the vessel to 300° F. for 180 min. After 180 minutes, the heating was turned off and the reactor was allowed to cool down and the pressure was released. The contents of the reactor were transferred to a new centrifuge tube. A sample of the reaction mixture was submitted for PFAS analysis. Finally, the reactor was rinsed twice using 5 ml of 0.4% NH3 in methanol and transferred to another centrifuge tube and submitted for PFAS analysis. Sodium Tetraborate and Concentrated Solution: A minimum of two replicates of a mix of concentrated solution of PFOA (1000 ppm) and PFOS (-100 ppm) solutions were taken in a 50-mL centrifuge tubes. To these solutions, 2mL of 30% hydrogen peroxide and 1 mL of well mixed super saturated slaked lime solution, were added and the centrifuge tubes was mixed vigorously for at least 30 seconds. This reaction mixture is transferred to the Parr Pressure vessel (no glass liner) and 1 mL of 2.5 ppm stock solution of sodium tetra borate was added and the vessel was closed and the reaction mixture was pressurized to 5 atmospheres with nitrogen and heated the vessel to 300° F. for 180 min. After 180 minutes, the heating was turned off and the reactor was allowed to cool down and the pressure was released. The contents of the reactor were transferred to a new centrifuge tube. A sample of the reaction mixture was submitted for PFAS analysis. Finally, the reactor was rinsed twice using 5 ml of 0.4% NH3 in methanol (preferably prepared freshly) and transferred to another centrifuge tube and submitted for PFAS analysis.

Mix of Glass Beads, Silica and Diatomaceous Earth and Concentrated Solution: A minimum of two replicates of a mix of concentrated solution of PFOA (1000 ppm) and PFOS (~100 ppm) solutions were taken in a 50-mL centrifuge tubes. To these solutions, 2 mL of 30% hydrogen peroxide and 1 mL of well mixed super saturated slaked lime solution, were added and the centrifuge tubes was mixed vigorously for at least 30 seconds. This reaction mixture is transferred to the Parr Pressure vessel (no glass liner) and 10 g of Diatomaceous earth, 10 g of glass beads and 2 g of silica was added and the vessel was closed and the reaction mixture was pressurized to 5 atmospheres with nitrogen and heated the vessel to 300° F. for 180min. After 180 minutes, the heating was turned off and the reactor was allowed to cool down and the pressure was released. The contents of the reactor were transferred to a new centrifuge tube. A sample of the reaction mixture was submitted for PFAS analysis. Finally, the reactor was rinsed twice using 5 ml of 0.4% NH3 in methanol and transferred to another centrifuge tube and submitted for PFAS analysis.

These reactions (Silica, Diatomaceous Earth and Sodium Tetraborate) using concentrated solutions, have shown ~30% of PFOA and 60% of PFOS destruction (Table 1). However, when the mix of three silica sources -glass beads, diatomaceous earth and the silica were used the %PFOA destruction remained the same, whereas the PFOS destruction decreased to 34% (Table 1).

Reproducibility of Destruction using New Glass Liner

New Glass Liner Experiments. To investigate the reproducibility of the PFOA and PFOS destruction in different glass liners, a new glass liner was purchased, and the experiments were conducted using 25 ppm PFOA and PFOS stock solution, and concentrated solution. New Glass Liner and 25 ppm stock solution mix: A minimum of two replicates of a mix of 25 parts per million concentration of PFOA and PFOS solutions were taken in a 50-mL centrifuge tubes. To these solutions, 2 mL of 30% hydrogen peroxide and 1 mL of well mixed super saturated slaked lime solution, were added and the centrifuge tubes was mixed vigorously for at least 30 seconds. This reaction mixture was transferred into the pre-new glass liner inside the Parr Pressure vessel. The vessel was closed and the reaction mixture was pressurized to 5 atmospheres with nitrogen and heated the vessel to 300° F. for 180min. After 180 minutes, the heating was turned off and the reactor was allowed to cool down and the pressure was released. The contents of the reactor were transferred to a new centrifuge tube. A sample of the reaction mixture was submitted for PFAS analysis. Finally, the reactor was rinsed twice using 5 ml of 0.4% NH3 in methanol and transferred to another centrifuge tube and submitted for PFAS analysis.

There was no destruction observed using the 25 ppm stock solution in the new glass liner (Table 1).

New Glass Liner and Concentrated Solution: A minimum of two replicates of a mix of concentrated solution of PFOA (1000 ppm) and PFOS (-100 ppm) solutions were taken in a 50-mL centrifuge tubes. To these solutions, 2mL of 30% hydrogen peroxide and 1mL of well mixed super saturated slaked lime solution, were added and the centrifuge tubes was mixed vigorously for at least 30 seconds. This reaction mixture was transferred into the pre-new glass liner inside the Parr Pressure vessel. The vessel was closed and the reaction mixture was pressurized to 5 atmospheres with nitrogen and heated the vessel to 300° F. for 180min. After 180 minutes, the heating was turned off and the reactor was allowed to cool down and the pressure was released. The contents of the reactor were transferred to a new centrifuge tube. A sample of the reaction mixture was submitted for PFAS analysis. Finally, the reactor was rinsed twice using 5 ml of 0.4% NH3 in methanol and transferred to another centrifuge tube and submitted for PFAS analysis.

In this reaction, there was 99.86% of PFOA and 99.22% of PFOS was destroyed (Table 1). The bottom portion of the glass liner to the level covered by the reaction mixture was etched suggesting the corrosive nature of the reaction mixture due to the formation of HF generated from defluorination of C—F bonds in PFOA and PFOS concentrated mix. The glass liner was cut into three portions—top, middle and bottom portions were submitted for surface analysis (FIG. 2). This result indicates that etching of the glass liner was needed for the destruction of PFOA and PFOS. However it was surprising to see there was no destruction with lower concentration (25 ppm) in the new glass liner, but with higher concentration reaction mixture, there was >99% destruction suggesting the etching of the glass which happened during the destruction of the PFOA and PFOS promoted the higher destruction. This observation is also confirmed from the glass beads experiments (Table 1) when the fresh glass beads were used in the 25 ppm stock solution, there was ~15-20% destruction of PFOA and PFOS, whereas when the pre-used glass beads(in concentrated Stock solution) was used, there was improved destruction of 65-98% destruction of PFOA and PFOS (Table 1), the etching occurred during the pre-use with concentrated solution aided in the improved destruction. The etching on the glass bead can be seen on the 3D laser scanning confocal microscopy images (FIG. 1) and the scanning electron microscopy images (FIG. 3). The elemental composition analysis of the glass beads and the glass liner surfaces have shown that there was no deposition of the F on the surfaces, indicating that there was no incorporation of F happening on the etched surfaces.

TABLE 1

Percent Destruction of PFOA and PFOS under different reaction conditions tested

| Reaction Mixture | Conditions | % Destruction PFOA | % Destruction PFOS |
|---|---|---|---|
| 25 ppm PFOA-PFOS/H2O2/CaO | new glass liner (first use) | 0.00 | 0.00 |
| Concentrated PFOA-PFOS/H2O2/CaO | new glass liner (first use with high concentration) | 99.86 | 99.22 |
| Concentrated PFOA-PFOS/H2O2/CaO | fresh glass beads | 57.96 | 78.43 |
| 25 ppm PFOA-PFOS/H2O2/CaO | fresh glass beads | 20.36 | 15.39 |
| 25 ppm PFOA-PFOS/H2O2/CaO | Pre-used glass beads in concentrated stock | 64.83 | 98.30 |
| Concentrated PFOA-PFOS/H2O2/CaO | Silica | 33.48 | 59.71 |
| Concentrated PFOA-PFOS/H2O2/CaO | Diatomaceous earth | 33.71 | 59.28 |
| Concentrated PFOA-PFOS/H2O2/CaO | Na tetraborate | 32.91 | 56.55 |
| Concentrated PFOA-PFOS/H2O2/CaO | Diatomaceous earth, silica, 10 g glass beads | 32.87 | 34.08 |
| Concentrated PFOA-PFOS/H2O2/CaO | Fresh glass beads soaked in 10M NaOH (1 day soak) | 37.10 | 69.78 |
| Concentrated PFOA-PFOS/H2O2/CaO | 30 g glass beads soaked in 10M NaOH or 2 days with fintermittent stirring) | 31.23 | 8.85 |
| Concentrated PFOA-PFOS/H2O2/NaOH | NaOH replacing CaO, no beads | 42.34 | 61.47 |
| Concentrated PFOA-PFOS/H2O2/NaOH | NaOH replacing CaO, with beads | 63.42 | 84.16 |

Surface Analysis of Glass Beads and Glass Liner.

The surface of a glass beaker and glass beads were analyzed using a Keyence 3D laser scanning confocal microscope. For all measurements, 50X objective was used. A measurement was performed on three glass beads from each environmental condition. The glass liner is a beaker and hence was feasible to do the surface analysis. Hence it was cut into three small portions so that surface analysis could be performed on different portions of the glass liner. Four beaker sections were measured: top, middle, bottom sidewall, bottom circular and each piece was measured in three locations across the surface. The 2D and 3D images were compared to control surfaces to determine the severity of degradation.

Glass Beads: Most severe degradation was seen on glass beads used in the following sets of conditions: Concentrated Stock, NaOH soaked beads; 25 ppm stock pre-used glass beads in Concentrated Stock, High Temperature/High Pressure; and Concentrated Stock, NaOH in place of CaO, High Temperature/High Pressure. Glass beads used in these treatments showed shallow elongated and circular attack, more prominent in the presence of NaOH reactions.

Glass Liners: Top of the glass liner shows no signs of cracking or etching. Surface is very smooth—Unaltered, very smooth and featureless; did not look like the control glass beads. On the middle part, Cracking/pitting and staining observed throughout the surface. The bottom of the glass liner showed uniformly dispersed circular pits that show some resemblance to the circular pits observed on the glass beads used in concentrated stock and using NaOH. Formation of these pits in both the glass beads and the glass liner are related to the high destruction of PFOA and PFOS as seen in the surface analysis figures of both glass beads and glass liner.

TABLE 2

Summary of observations of 3D Laser scanning Confocal Microscopy images.

| Sample Type | Generated by | Surface Analysis |
| --- | --- | --- |
| Glass Beads | Concentrated Stock, High Temperature/High Pressure | Circular and elongated attack distributed across surface |
| Glass Beads | 25 ppm stock pre-used glass beads in Concentrated Stock, High Temperature/High Pressure | Circular and elongated attack, residual chemicals still on the surface in some spots |
| Glass Beads | Concentrated Stock, NaOH soaked beads, High Temperature/High Pressure | Shallow elongated and circular attack |
| Glass Beads | Concentrated Stock, NaOH in place of CaO, High Temperature/High Pressure | Severe attack mostly in the form of circular pits |
| Glass Beads | Concentrated Stock, NaOH soaked beads, High Temperature/High Pressure | Possible cracking. No deep attack. |
| Glass Beads | Concentrated Stock, Diatomaceous earth, silica, High Temperature/High Pressure | No change observed from control glass beads |
| Control Glass Beads | Un-used, muffled | Small shallow scratches and abrasion marks throughout. |

What is claimed:

1. A method of destroying per- and polyfluoroalkyl substances (PFAS), comprising: reacting PFAS in an aqueous solution in the presence of silica at a temperature of at least 100° C.;
further comprising etching the silica with aqueous hydrofluoric acid (HF) prior to the step of reacting PFAS in an aqueous solution in the presence of silica at a temperature of at least 100° C.;
wherein at least 90% of the PFAS is destroyed.

2. A method of destroying per- and polyfluoroalkyl substances (PFAS), comprising: reacting PFAS in an aqueous solution in the presence of silica at a temperature of at least 100° C.;
etching the silica with aqueous hydrofluoric acid (HF) prior to the step of reacting PFAS in an aqueous solution in the presence of silica at a temperature of at least 100° C.;
wherein the HF does not originate from PFAS; and
wherein at least 90% of the PFAS is destroyed.

3. The method of claim 1 wherein the HF is formed from a PFAS solution comprising at least 50 PPM PFAS.

4. The method of claim 1 wherein the silica comprises a borosilicate glass in which the reaction is conducted.

5. The method of claim 1 conducted at a temperature at 110 to 250.

6. The method of claim 1 conducted at a pressure of 2-10 atm.

7. The method of claim 1 conducted at a $N_2$ or Ar partial pressure of at least 2 atm.

8. The method of claim 1 conducted in a batch process for between 10 minutes and 5 hours.

9. The method of any of the preceding claims conducted essentially in the absence of: additional reactants, UV, and additional catalysts.

10. The method of any of claims 1-8 wherein the compositions present in the step of reacting consist essentially of water, PFAS, hydrogen peroxide, calcium hydroxide, silica and intermediates or products occurring in the method.

11. The method of any of claims 1-8 wherein the silica comprises silica particles and, optionally, wherein the reaction is not conducted in a glass vessel.

12. The method of any of claims 1-8 wherein at least 99% of the PFAS or perfluorooctanoic acid (PFOA) and/or perfluorooctane sulfonate (PFOS) is destroyed.

13. The method of any of claims 1-8 wherein the method begins with the aqueous solution comprising at least 100 PPM PFAS.

14. The method of any of claims 1-8 wherein the method begins with the aqueous solution comprising at least 50 PPM PFOA.

15. The method of any of claims 1-8 wherein the method begins with an the aqueous solution comprising at least 50 PPM PFOS.

* * * * *